United States Patent

Olsson

[11] Patent Number: 5,735,528
[45] Date of Patent: Apr. 7, 1998

[54] SELF-LUBRICATING PACKING PIECE

[75] Inventor: Roy C. Å. Olsson, Fågelmar, Sweden

[73] Assignee: Lycab AB, Karlskrona, Sweden

[21] Appl. No.: 656,260

[22] PCT Filed: Dec. 17, 1993

[86] PCT No.: PCT/SE93/01086

§ 371 Date: Sep. 16, 1996

§ 102(e) Date: Sep. 16, 1996

[87] PCT Pub. No.: WO95/16742

PCT Pub. Date: Jun. 22, 1995

[51] Int. Cl.$^6$ .................................................. F16J 15/16
[52] U.S. Cl. ........................ 277/1; 277/227; 277/DIG. 6
[58] Field of Search .................................. 277/1, 233, 227, 277/DIG. 6; 428/146, 147, 323, 327

[56] References Cited

U.S. PATENT DOCUMENTS

| | | | |
|---|---|---|---|
| 1,866,757 | 7/1932 | De Vries | 277/227 |
| 3,130,976 | 4/1964 | Niswander | 277/227 |
| 3,985,933 | 10/1976 | Mehta et al. | |
| 4,580,794 | 4/1986 | Gibbons | 277/DIG. 6 |
| 4,677,253 | 6/1987 | Blomqvist | 174/35 R |
| 4,767,086 | 8/1988 | Blomqvist | 248/56 |
| 4,823,526 | 4/1989 | Johansson et al. | 52/220 |
| 5,110,685 | 5/1992 | Cross et al. | |
| 5,314,752 | 5/1994 | Bova et al. | |
| 5,368,315 | 11/1994 | Viksne | 277/DIG. 6 |

FOREIGN PATENT DOCUMENTS

| | | | |
|---|---|---|---|
| 1261614 | 2/1968 | Germany . | |
| 4207737 | 9/1993 | Germany . | |
| 4228073 | 3/1994 | Germany | 277/227 |
| 0017261 | 5/1980 | Japan | 277/DIG. 6 |
| 0024261 | 3/1981 | Japan | 277/DIG. 6 |
| 0103974 | 6/1982 | Japan | 277/DIG. 6 |
| 0035176 | 2/1989 | Japan | 277/227 |

OTHER PUBLICATIONS

Tekniska nomenklaturcentralen, "Glossary of plastic and rubber terms," TNC 84, Nov. 15, 1986, pp. 142, 61.

"Plaster och deras anvandning inom industrin," (Plastic and their industrial uses) p. 62. Klaas Stoeckhert, Forum publ. Stockholm, 1955.

Patent Abstract of Japan, vol. 9, No. 192, C-296, abstract of JP.A.60-60141 (Nippon Oil Seal Kogyo K.K.) 6 Apr. 1985.

*Primary Examiner*—Scott Cummings
*Attorney, Agent, or Firm*—Cushman Darby & Cushman IP Group of Pillsbury Madison & Sutro LLP

[57] ABSTRACT

A seal is provided around an elongated object by providing a plurality of packing pieces having external surfaces, each said packing piece being made of a material composition comprising at least one type of elastomer, and 1–10 percent by weight lubricant, calculated on the total weight of the composition, the lubricant being essentially non-combinable with said elastomer. A bushing is provided around the elongated object, the bushing is packed with the packing pieces, and, in use, the lubricant migrates to the preference, the material composition includes 1–3 percent by weight lubricant, 25–32 percent by weight elastomer, 10–13 percent by weight filler, 1–3 percent by weight activator, 0.01–3 percent by weight accelerator, 0.01–2 percent by weight vulcanizing agent, 35–55 percent by weight flame retardant, 5–8 percent by weight pH-stabilizing agent, 0.01–1 percent by weight of an agent for enhancing cross-linking between rubber and filler, 1–4 percent by weight mould release agent, and 1–3 percent by weight colorant, calculated on the total weight of the material composition. The lubricant is substantially uncombined with any others of these ingredients of the material composition.

16 Claims, 1 Drawing Sheet

SELF-LUBRICATING PACKING PIECE

This application claims benefit of international application PCT/SE93/01086 filed Dec. 17, 1993.

BACKGROUND OF THE INVENTION

The present invention relates to elastically deformable seals, and particularly to packing pieces for cable and/or pipe lead-throughs or bushings, wherein the seals are composed of material which possesses self-lubricating properties. The present invention also relates to such material and also to the use of such seals and materials.

By seals is meant Application mainly articles of deformable materials which are intended to be used in bushings, lead-throughs, throughlets and the like to seal cables, pipes and the like in walls and like structures against the through-passage of water, dust, flames, gas, pressure and explosions, for instance.

A cable or pipe bushing will normally include at least two packing pieces, which are most often comprised of elastically deformable material. When installing a bushing, it is necessary to grease or lubricate the packing pieces used in the bushing, partly to impart desired sealing properties to the bushing and partly to facilitate the actual process of installation.

Hitherto, the packing pieces have been greased by hand, the lubricant used to this end being delivered separately in a stick-like form, for instance. The lubricants are typically comprised of conventional greases or fats and lubricating greases such as Vaseline, ™Petroleum silicone fats, animal fats, etc.

As will be understood, the aforedescribed method of greasing packing pieces is a particularly time-consuming task. There is also a risk that some part of the packing piece will be left ungreased or will not be greased adequately enough, due to the human factor. The dependency on lubricants that are delivered in separate packages also has a number of drawbacks: The lubricant may be completely used-up before all packing pieces have been greased; it is necessary for the fitter to unpack the lubricant at the same time as he/she is engaged with fitting the actual bushing; and the use of separately packaged lubricants constitutes a load on the environment, etc.

SUMMARY OF THE INVENTION

An object of the present invention is to provide seals of the aforesaid kind, particularly seals in the form of packing pieces, which will assist in eliminating the aforesaid problems and drawbacks associated with the known technique, these problems and drawbacks having prevailed for many years.

Another object of the present invention is to provide a material from which the aforesaid seals can be formed, this material also assisting in avoiding the aforesaid drawbacks and problems.

Other objects of the present invention will be apparent from the following.

The aforesaid objects are achieved partly with the aid of elastically deformable seals in the form of so-called packing pieces or the like which are comprised of a material composition which is based on at least one type of elastomer, these seals being characterized in that there is included in the material composition 1–10 percent by weight, calculated on the total weight of the material composition, of a lubricant which in manufacturing the packing pieces or the like, is admixed substantially uniformly in the composition and which is chemically substantially non-combinable with the composition and which in use, migrates to the surface of the seal and therewith imparts self-lubricating properties to the surface of the seal, and partly with the aid of a material composition for forming the elastically deformable seals, the material composition including at least one type of elastomer and being characterized in that the composition includes 1–10 percent by weight, calculated on the total weight of the composition, of a lubricant which is chemically substantially non-combinable with the material composition.

By packing pieces is meant such elements as those which are intended to be fitted, preferably stationarily, in cable and pipe bushings or lead-throughs and to contribute therein towards a substantial part of the sealing properties of said bushings.

The lubricant used in accordance with the invention is chemically substantially non-combinable with the material composition in which it is mixed, by which is meant that the lubricant and the composition will not together form a stable homogenous mixture because of their mutual chemical and/or physical dissimilarities. Thus, the homogeneity of the mixture does not remain stable over the passage of time. Instead, the mixture remains substantially fully homogenous from an initial point of time, i.e. from approximately the time at which the material composition was prepared, up to roughly the time at which the finished product, for instance a packing piece, has just been obtained, whereafter the composition will pass to a progressively greater inhomogeneous state as a result of the efforts of the two components to separate from one another due to their mutual repelling effect. This can be expressed as the lubricant successively migrating from within the packing piece material up to the surface of the packing piece and onto the surface thereof.

Such migration is generally undesirable (see, for instance, TNC's "Glossary of Plastic and Rubber Terms" (TNC 84) and the term "Migration"), since the migrating substance generally tends to impair the quality of the polymeric material, for instance by lying as a generally white coating on the surface of the material and therewith impede further working of the material (see, for instance, "Plaster och deras användning inom industrin", ( Plastics and their industrial uses) page 62, Klaus Stoeckhert, Forum publ., Stockholm 1955).

On the other hand, migration is used in accordance with the invention to bring lubricant continuously to the surface of the finished seal, which equates with the expression that the surface of the seal has self-lubricating properties.

According to the present invention, the aforesaid lubricants may be substances which are conventionally added to polymer mixtures in production processes to facilitate ejection of moulded articles from the moulds upon completion of a moulding process and which can be mixed with these mixtures to a limited extent, although the main purpose of the lubricants is to reduce friction between the surface of the product, i.e. a seal, preferably the surface of a packing piece, and another surface, for instance the surface of a cable, a pipe, another packing piece or some other part of a pipe or cable bushing, by forming a lubricant boundary or interface between the respective surfaces; in addition, the lubricant contributes towards the sealing properties of the seal.

Any lubricant whatsoever can be used when practicing the present invention, provided that the lubricant is suitable for the purpose intended. For instance, the lubricant may be chosen from different sorts of oils, fats, greases, waxes, monovalent or multivalent amines, amides, esters or alcohols or the like, or combinations thereof. However, the lubricant preferably has the form of fatty acid amides, particularly oleyl amides, for instance of the kind sold commercially by Unichema Chemie BV, Netherlands, under the trade name "UNISLIP 1757".

By "elastomer" is meant in this document primarily polymers of the rubber or thermoplastic elastomer type, such as the types defined in the aforesaid "Glossary of Plastic and Rubber Terms". When practicing the present invention, any suitable type of rubber or thermoplastic elastomer whatsoever can be used, although rubber will be preferably used, for instance different types of diene rubber (including among other things butadiene rubber, isoprene rubber, natural rubber, nitrile rubber and styrene rubber), ethylene-propylene rubber, silicone rubber and butyl rubber or the like or combinations thereof. Ethylene-propylene rubber is particularly preferred, and then primarily so-called EPDM rubber, for instance of the kind obtainable from the Exxon Chemical Co., U.S.A., under the trade name "VISTALON 8504".

According to one embodiment of the present invention, the material composition includes about 20-40 percent by weight elastomer, about 5-20 percent by weight filler, about 0.5-5 percent by weight activator, about 0.5-5 percent by weight accelerator and about 0.5-5 percent by weight vulcanizing agent, and has admixed therewith about 1-10 percent by weight lubricant, wherein the remainder of the composition is comprised of optional additives, such as pH-stabilizing agent, flame retardants, colourants and/or mould release agents up to 100 percent by weight, all percentages being calculated on the total weight of the material composition.

According to one preferred embodiment, the material composition includes about 25-32 percent by weight elastomer, about 10-13 percent by weight filler, about 1-3 percent by weight activator, <3 percent by weight accelerator and <2 percent by weight vulcanizing agent, and has mixed therewith about 1-3 percent by weight lubricant, wherein the remainder of the composition is made-up of flame retardant, pH-stabilizing agent, viscosity-reducing process-auxiliary agent, means for enhancing cross-linking between rubber and filler, mould release agent and colorant up to 100 percent by weight, all percentages being calculated on the total weight of the material composition.

DETAILED DESCRIPTION

Figure 1:
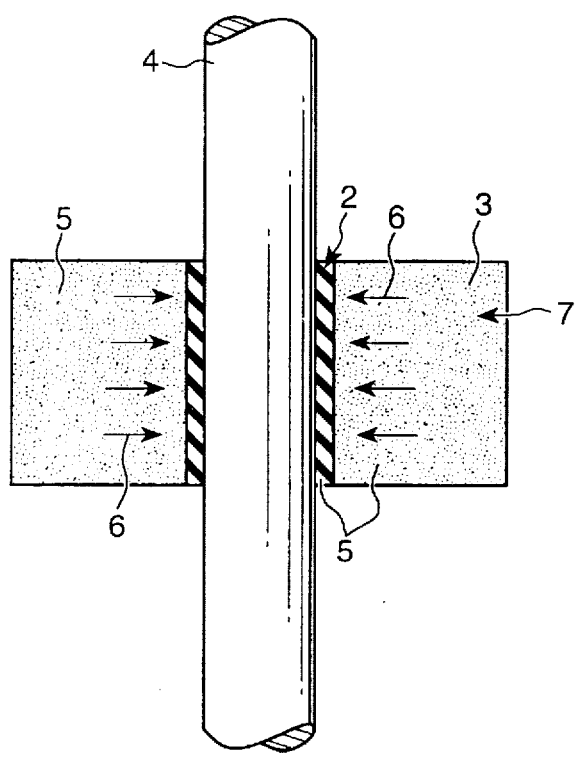
FIG. 1 is a schematic longitudinal sectional view showing a shaft provided with a seal made of a composition provided in accordance with the principles of the present invention.

The present invention is described in more detail below with reference to a working Example. The working Example is solely intended to provide a general illustration of the invention and shall not be considered to limit the scope of the invention.

EXAMPLE

The following ingredients and quantities were used in the preparation of a material composition:

| | |
|---|---|
| EPDM (VISTALON 8504) | 29 kg |
| Whiting | 11 kg |
| Stearine | 6 kg |
| Antimonoxide + aluminium hydroxide | 39 kg |
| Magnesium carbonate | 5 kg |
| Zinc oxide | 1 kg |
| Tricresyl phosphate | 1 kg |
| Polyethylene (in wax form) | 1 kg |
| Zinc stearate | 1 kg |
| Iron + titanium oxide | 1.5 kg |
| Cyclohexyl benzothiazyle sulfenamide | 0.5 kg |
| γ-Mercaptopropyltrimethoxysilane | 0.5 kg |
| Dithiodimorpholine | 1 kg |
| Sulphur | 1 kg |
| Oleyl amide (UNISLIP 1757) | 1.5 kg |

All ingredients, with the exception of sulphur, cyclohexyl benzothiazyle sulfenamide (CBS) and dithiodimorpholine (DTDM) were introduced into a closed mixer (Intermixer K5, from Francis Shaw & Co. Ltd., England) and there mixed. The stamp pressure was about 22-27 Pa. The mixture was heated by the mixing process, no external heat being supplied. After about six minutes, the mixture had reached a temperature of about 125° C., whereafter the mixture was emptied onto a rolling mill, flattened, removed, and cooled in the take-off and then placed on a pallet. The mixture was then passed back to the mixture and sulphur, CBS and DTDM were added while mixing. After about five minutes, the mixture had reached a temperature of about 90° C. and was emptied onto the rolling mill, flattened, removed and cooled in the take-off and then placed on a pallet. The non-vulcanized rubber slabs were then granulated to granules in a granulator. The granulate was fed into a carousel press by means of a screw feeder and was injected from the press into different tools and shaped into packing pieces under pressure and at a vulcanizing temperature of about 160° C. The finished, self-lubricating packing pieces were removed from the tools after some minutes. After cooling and being cleaned, the packing pieces were ready to be packaged and delivered.

In the embodiment shown in FIG. 1a the packing pieces of a seal 1 are arranged so as to surround and seal with a shaft 4. The composition of the seal packing pieces is an initially homogeneous mixture of elastomer 3 and lubricant 5, as described herein. Because the elastomer 3 and lubricant 5 do not bind together, in use the lubricant 5 migrates (indicated by arrows 6) to the surface of the elastomeric body and thus provides lubrication at the interface 2 between the elastomeric seal and the shaft 4.

It will be understood that other types of seals and other material compositions than those described are embraced by the scope of the present invention, as will be obvious to all those skilled in this particular technical field.

I claim:

1. An elastically deformable seal having an external surface, and comprising:

a material composition based on at least one type of elastomer, said material composition comprising 1-10 percent by weight lubricant, calculated on the total weight of the material composition, said lubricant being substantially uniformly admixed in the material composition in said seal as manufactured and said lubricant being chemically substantially non-combined and substantially non-combinable with the material composition and migrating in use of the seal to said surface of the seal and therewith imparting self-lubricating properties to said surface of said seal.

2. A seal according to claim 1, wherein the elastomer comprises vulcanized rubber.

3. A seal according to claim 2, wherein the vulcanized rubber comprises ethylene-propylene rubber.

4. A seal according to any one of claims 1–3, wherein the lubricant comprises fatty acid amide.

5. A seal according to claim 4, wherein the fatty acid amide comprises oleyl amide.

6. A seal according to claim 1, wherein the material has added thereto 1–3 percent by weight lubricant, calculated on the total weight of the material composition in said seal.

7. A seal according to claim 6, wherein the material composition comprises 25–32 percent by weight elastomer, 10–13 percent by weight filler, 1–3 percent by weight activator, 0.01–3 percent by weight accelerator, 0.01–2 percent by weight vulcanizing agent, 35–55 percent by weight flame retardant, 5–8 percent by weight pH-stabilizing agent, 0.01–1 percent by weight of an agent for enhancing cross-linking between rubber and filler, 1–4 percent by weight mould release agent, and 1–3 percent by weight colorant, calculated on the total weight of the material composition.

8. A material composition for producing elastically deformable seals including:

at least one type of elastomer, and 1–10 percent by weight lubricant, calculated on the total weight of said composition, said lubricant being substantially uniformly admixed with said elastomer and being chemically substantially non-combined and non-combinable with, but migratable in use relative to, said elastomer.

9. A material composition according to claim 8, characterized in that the elastomer comprises rubber.

10. A composition according to claim 9, wherein the rubber comprises ethylene-propylene rubber.

11. A composition according to any one of claims 8–9, wherein the lubricant comprises fatty acid amide.

12. A composition according to claim 11, wherein the fatty acid amide comprises oleyl amide.

13. A composition according to claim 8, wherein the lubricant is present in the composition in a concentration of 1–3 percent by weight calculated on the total weight of said composition.

14. A composition according to claim 13, wherein the composition comprises 25–32 percent by weight rubber, 10–13 percent by weight filler, 1–3 percent by weight activator, 0.01–3 percent by weight accelerator, 0.01–2 percent by weight vulcanizing agent, 35–55 percent by weight flame retardant, 5–8 percent by weight pH-stabilizing agent, 0.01–1 percent by weight of an agent for enhancing cross-linking between rubber and filler, 1–4 percent by weight mould release agent, and 1–3 percent by weight colorant, calculated on the total weight of the material composition.

15. A method for sealing around an elongated object, comprising:

providing a plurality of packing pieces having external surfaces, each said packing piece being made of a material composition comprising at least one type of elastomer, and 1–10 percent by weight lubricant, calculated on the total weight of said composition, said lubricant being chemically substantially non-combinable with and chemically substantially non-combined with said elastomer, said composition at time of manufacture of each said packing piece being or substantially homogeneous mixture of said lubricant and said elastomer;

providing a bushing around the elongated object;

packing said bushing with said packing pieces; and using said elongated object, and, in connection with such use, allowing said lubricant to migrate to said surfaces.

16. The method of claim 15, wherein:

said material composition comprises 1–3 percent by weight lubricant, 25–32 percent by weight elastomer, 10–13 percent by weight filler, 1–3 percent by weight activator, 0.01–3 percent by weight accelerator, 0.01–2 percent by weight vulcanizing agent, 35–55 percent by weight flame retardant, 5–8 percent by weight pH-stabilizing agent, 0.01–1 percent by weight of an agent for enhancing cross-linking between rubber and filler, 1–4 percent by weight mould release agent, and 1–3 percent by weight colorant, calculated on the total weight of the material composition; said lubricant being substantially uncombined with any of said filler, activator, accelerator, vulcanizing agent, flame retardant, pH-stabilizing agent, cross-linking enhancing agent, mould release agent and colourant.

* * * * *

Disclaimer

5,735,528—Roy C. A. Olsson, Fågelmar, Sweden. SELF-LUBRICATING PACKING PIECE. Patent dated Apr. 7, 1998. Disclaimer filed Oct. 2, 1998, by the assignee, Lycab AB.

Hereby enters this disclaimer to claims 8-14 of said patent.

*(Official Gazette,* November 17, 1998)

(12) REEXAMINATION CERTIFICATE (4365th)
United States Patent
Olsson

(10) Number: US 5,735,528 C1
(45) Certificate Issued: May 22, 2001

(54) SELF-LUBRICATING PACKING PIECE

(75) Inventor: Roy C. Å. Olsson, Fågelmar (SE)

(73) Assignee: Lycab AB, Karlskrona (SE)

Reexamination Request:
No. 90/005,682, Mar. 17, 2000

Reexamination Certificate for:
Patent No.: 5,735,528
Issued: Apr. 7, 1998
Appl. No.: 08/656,260
Filed: Sep. 16, 1996

(22) PCT Filed: Dec. 17, 1993
(86) PCT No.: PCT/SE93/01086
    § 371 Date: Sep. 16, 1996
    § 102(e) Date: Sep. 16, 1996
(87) PCT Pub. No.: WO95/16742
    PCT Pub. Date: Jun. 22, 1995

(51) Int. Cl.⁷ .................................................. F16J 15/16
(52) U.S. Cl. ..................... 277/300; 277/585; 277/627; 277/944
(58) Field of Search .................................. 277/532, 534, 277/540, 627, 300, 585, 944

(56) References Cited
FOREIGN PATENT DOCUMENTS

| | | |
|---|---|---|
| 556545A1 | 1/1993 | (EP). |
| 556545B1 | 10/1995 | (EP). |
| 4277378 | 10/1992 | (JP). |

Primary Examiner—Anthony Knight

(57) ABSTRACT

A seal is provided around an elongated object by providing a plurality of packing pieces having external surfaces, each said packing piece being made of a material composition comprising at least one type of elastomer, 1–10 percent by weight lubricant, calculated on the total weight of the composition, the lubricant being essentially non-combinable with said elastomer. A bushing is provided around the elongated object, the bushing is packed with the packing pieces, and, in use, the lubricant migrates to the preference, the material composition includes 1–3 percent by weight lubricant, 25–32 percent by weight elastomer, 10–13 percent by weight filter, 1–3 percent by weight activator, 0.01–3 percent by weight accelerator, 0.01–2 percent by weight vulcanizing agent, 35–55 percent by weight flame retardant, 5–8 percent by weight pH-stabilizing agent, 0.01–1 percent by weight of an agent for enhancing cross-linking between rubber and filler, 1–4 percent by weight mould release agent, and 1–3 percent by weight colorant, calculated on the total weight of the material composition. The lubricant is substantially uncombined with any others of these ingredients of the material composition.

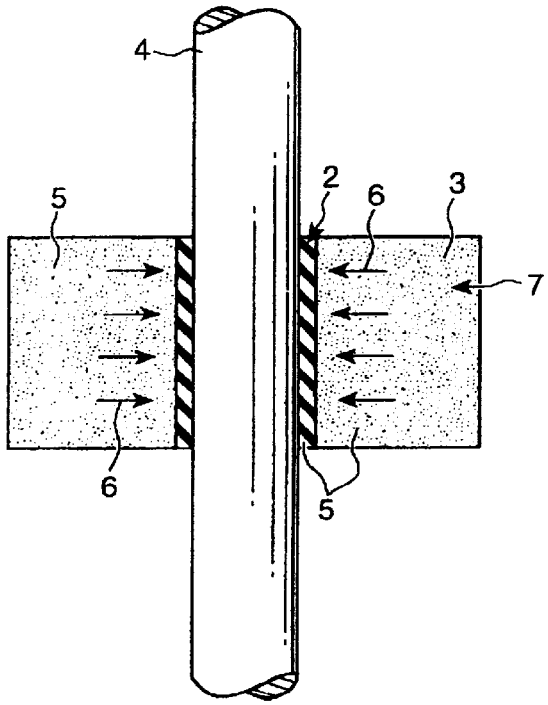

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15 and 16 is confirmed.

Claims 8–14 were previously disclaimed.

Claim 1 is determined to be patentable as amended.

Claims 2–7, dependent on an amended claim, are determined to be patentable.

New claims 17–22 are added and determined to be patentable.

1. An elastically deformable seal having an external surface and comprising:
   a material composition based on at least one type of elastomer,
   said material composition comprising *20–40 percent by weight elastomer, and* 1–10 percent by weight lubricant, calculated on the total weight of the material composition,
   said lubricant being substantially uniformly admixed in the material composition in said seal as manufactured and said lubricant being chemically substantially non-combined and substantially non-combinable with the material composition and migrating in use of the seal to said surface of the seal and therewith imparting self-lubricating properties to said surface of said seal.

*17. An elastically deformable seal constructed and arranged to substantially stationarily seal an opening having an elongate member therethrough, the seal having an external surface and comprising:*
   *a material composition based on at least one type of elastomer, said material composition comprising,*
   *25–32 percent by weight elastomer,*
   *10–13 percent by weight filler,*
   *1–3 percent by weight activator,*
   *0.01–3 percent by weight accelerator,*
   *0.01–2 percent by weight vulcanizing agent,*
   *35–55 percent by weight flame retardant,*
   *5–8 percent by weight pH-stabilizing agent,*
   *0.01–1 percent by weight of an agent for enhancing cross-linking between rubber and filler,*
   *1–4 percent by weight mold releaase agent,*
   *1–3 percent by weight colorant, and*
   *1–10 percent by weight lubricant, calculated on the total weight of the material composition,*
   *wherein the lubricant is essentially uniformly admixed in the material composition, and is essentially non-combinable with the material composition and will thus migrate to the surface of the seal and therewith impart self-lubricating properties to the surface of said seal.*

*18. A seal according to claim 17 wherein the elastomer comprises vulcanized rubber.*

*19. A seal according to claim 17 wherein the rubber comprises ethylene-propylene rubber.*

*20. A seal according to claim 17 wherein the lubricant comprises fatty acid amide.*

*21. A seal according to claim 20 wherein the lubricant comprises oleyl amide.*

*22. A seal according to claim 17 wherein the material composition has added thereto 1–3 percent by weight lubricant, calculated on the total weight of the material composition in said seal.*

* * * * *